(12) United States Patent
Buttar et al.

(10) Patent No.: US 7,131,346 B1
(45) Date of Patent: Nov. 7, 2006

(54) SPIN STAND TESTING SYSTEM WITH FINE POSITIONER FOR HEAD STACK ASSEMBLY

(75) Inventors: Jagdeep S. Buttar, Fremont, CA (US); David Terrill, Walnut Creek, CA (US); Kenneth R. Davies, Gilroy, CA (US); Herman Ferrier, Scotts Valley, CA (US); Xiaodong Che, Saratoga, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 190 days.

(21) Appl. No.: 10/966,543

(22) Filed: Oct. 15, 2004
(Under 37 CFR 1.47)

(51) Int. Cl.
*G11B 5/56* (2006.01)
*G01R 33/12* (2006.01)

(52) U.S. Cl. .................. 73/865.9; 324/212; 360/294.4

(58) Field of Classification Search .. 360/254.2–254.6, 360/274, 294.4, 264.1, 266, 264.2, 264.3, 360/265.7, 265.9, 266.1; 324/210, 212; 73/865.9
See application file for complete search history.

(56) References Cited

U.S. PATENT DOCUMENTS

| | | | | |
|---|---|---|---|---|
| 6,140,815 | A | 10/2000 | Greene et al. | 324/252 |
| 6,166,536 | A * | 12/2000 | Chen et al. | 324/212 |
| 6,216,242 | B1 | 4/2001 | Schaenzer | 714/723 |
| 6,226,767 | B1 | 5/2001 | Sundaram | 73/105 X |
| 6,229,664 | B1 * | 5/2001 | Albrecht et al. | 324/212 X |
| 6,242,910 | B1 * | 6/2001 | Guzik et al. | 324/212 |
| 6,262,572 | B1 | 7/2001 | Franco et al. | 324/212 |
| 6,265,868 | B1 * | 7/2001 | Richter | 324/212 |
| 6,267,004 | B1 | 7/2001 | Ku et al. | 73/104 |
| 6,292,316 | B1 * | 9/2001 | Dietzel et al. | 324/212 X |
| 6,296,552 | B1 | 10/2001 | Boutaghou et al. | 451/41 |
| 6,366,416 | B1 * | 4/2002 | Meyer et al. | 324/212 X |
| 6,373,243 | B1 * | 4/2002 | Takano et al. | 324/212 |
| 6,459,260 | B1 | 10/2002 | Bonin et al. | 324/158.1 |
| 6,483,300 | B1 | 11/2002 | Severson et al. | 324/212 |
| 6,510,752 | B1 | 1/2003 | Sacks et al. | 73/865.9 X |
| 6,531,867 | B1 | 3/2003 | Greene et al. | 324/262 |
| 6,538,838 | B1 | 3/2003 | Sacks et al. | 324/210 X |
| 6,556,006 | B1 * | 4/2003 | Li et al. | 324/210 |
| 6,566,870 | B1 | 5/2003 | Sorenson et al. | 324/210 |
| 6,580,572 | B1 * | 6/2003 | Yao et al. | 324/212 X |

(Continued)

FOREIGN PATENT DOCUMENTS

JP          08161717 A  *  6/1996

(Continued)

OTHER PUBLICATIONS

Che, Xiaodong, et al., "Utilization of Continuous PES Signal for H/M Component Characterizations," INTERMAG 2003—The 2003 IEEE International Magnetics Conference (Mar. 30-Apr. 3, 2003), Boston, Massachusetts, pp. 1-3.

(Continued)

*Primary Examiner*—Thomas P. Noland
(74) *Attorney, Agent, or Firm*—Joshua C. Harrison, Esq.; Carr & Ferrell LLP

(57) ABSTRACT

Head stack fixtures for securing head stack assemblies to spin stand testing systems, and spin stand testing systems incorporating such fixtures, are disclosed. Exemplary head stack fixtures comprise a base supporting a piezoelectric actuator. The base includes an attachment mechanism for securing the HSA in such a way that the HSA will pivot relative to the base. When the HSA is secured to the base, the piezoelectric actuator engages the HSA. The piezoelectric actuator is therefore able to pivot the HSA relative to the base for fine positioning of a head of the HSA.

17 Claims, 4 Drawing Sheets

U.S. PATENT DOCUMENTS

| | | |
|---|---|---|
| 6,608,477 B1 | 8/2003 | Sacks et al. ............... 324/210 |
| 6,653,809 B1 | 11/2003 | Nakatani ................... 318/560 |
| 6,696,831 B1 | 2/2004 | Nozu ........................ 324/210 |
| 2002/0049104 A1* | 4/2002 | Ito ............................. 474/70 |
| 2004/0130320 A1* | 7/2004 | Guzik et al. ............... 324/210 |
| 2006/0066300 A1* | 3/2006 | Che et al. .................. 324/210 |
| 2006/0103382 A1* | 5/2006 | Mihara et al. .......... 324/212 X |

FOREIGN PATENT DOCUMENTS

| | | |
|---|---|---|
| WO | WO 9958995 A * | 11/1999 |
| WO | WO 2004027760 A1 * | 4/2004 |
| WO | WO 2004027761 A1 * | 4/2004 |

OTHER PUBLICATIONS

Guzik Technical Enterprises, Spinstand S-1701 User's Manual, Revision 2.1, PN: 02-103653-02, pp. i-iii and 5-88, by Oct. 2004.

* cited by examiner

SPIN STAND TESTING SYSTEM WITH FINE POSITIONER FOR HEAD STACK ASSEMBLY

BACKGROUND OF THE INVENTION

1. Field of the Invention

The disclosure relates generally to the field of magnetic disk drives, and more particularly to apparatus and methods related to testing disk drive components.

2. Description of the Prior Art

Magnetic disk drives are used to store and retrieve data for digital electronic apparatuses such as computers. A typical magnetic disk drive comprises a head, including a slider and a transducer, in very close proximity to a surface of a rotatable magnetic disk. The transducer, in turn, includes a write element and/or a read element. As the magnetic disk rotates beneath the head, a very thin air bearing is formed between the surface of the magnetic disk and an air bearing surface of the slider. The air bearing causes the head to "fly" above the surface of the magnetic disk with a separation ("fly height") that is typically less than 40 nanometers in contemporary disk drives. As the head flies over the magnetic disk, the write element and the read element can be alternately employed to write and read data bits along a magnetic "track" on the magnetic disk.

It will be appreciated that the head is a highly complex component and, accordingly, heads are preferably qualified before being assembled into disk drives. Commonly, heads are tested after being assembled into either a Head Gimbal Assembly (HGA) or after one or more HGAs are assembled into a Head Stack Assembly (HSA). The HGA typically comprises the head, a load beam, a gimbal that attaches the head to the load beam, a swage mount, and electrical traces to facilitate electrical connection of the transducer of the head to a pre-amplifier circuit. The HSA comprises one or more HGAs in a stacked arrangement for use with one or both sides of a magnetic disk and/or multiple magnetic disks. The HSA also typically comprises an actuator arm structure that can pivot in response to torques applied by a voice coil motor.

A spin stand is a common testing apparatus for testing writing and reading characteristics of heads. Generally, the spin-stand includes a rotatable disk and a positioning device that secures a HGA or HSA. The positioning device allows the head to be moved to a desired position over the disk. Accordingly, the positioning device typically includes two coarse motors for moving the head in two orthogonal directions relative to the disk.

One issue with spin stand testing relates to the problem of keeping the head aligned with a track on the disk. In a disk drive, a feedback loop known as a closed-loop servo is employed to keep the head properly aligned. The closed-loop servo relies on regularly spaced patterns on the disk, known as servo bursts, to determine any misalignment, and then corrects for the misalignment by adjusting the position of the head. However, spin stands historically have been "open-loop" systems, meaning that there is no feedback mechanism for keeping the head aligned with a track. Open-loop systems designed to have very high mechanical precision worked adequately when tracks were relatively wide. However, the demand for increased information storage density and associated improvements in write and read elements have lead to narrower track widths and narrower read elements, and therefore, what were once considered to be very small sources of mechanical imprecision now can cause the head to move significantly off-track during testing.

Accordingly, what is needed is a spin stand that is able to dynamically adjust the position of the head to keep the head aligned with a track during testing.

SUMMARY

According to an embodiment of the invention, a head stack fixture for securing a head stack assembly during spin stand testing comprises a base and a fine positioner including a piezoelectric actuator. The base includes an attachment mechanism for pivotably attaching the head stack assembly to the base. The fine positioner is attached to the base and to the head stack assembly and is configured to pivot the head stack assembly relative to the base.

In some embodiments, the fine positioner further includes an actuator housing having a shape of a parallelogram. In some of these embodiments, the piezoelectric actuator is disposed within the parallelogram. The parallelogram can also include notches that reduce the thickness of the actuator housing near the corners of the parallelogram to deform more easily in response to the piezoelectric actuator. The piezoelectric actuator can deform the parallelogram, in some embodiments, in order to pivot the head stack assembly. In some of these embodiments the fine positioner further includes a set screw disposed against a first end of the piezoelectric actuator, and the piezoelectric actuator works against the set screw to deform the parallelogram. The set screw can also provide a pre-load to the piezoelectric actuator.

According to an embodiment of the invention, a spin stand testing system comprises a rotatable magnetic recording disk including a track, a head stack fixture for securing a head stack assembly as described above, and a controller configured to actuate a piezoelectric actuator of the head stack fixture to optimize a read signal from a head of the head stack assembly. In some embodiments, the controller actuates the piezoelectric actuator by applying a voltage thereto. The read signal can be generated by reading alignment information on the track with the head, and optimizing the read signal can include using a closed-loop servo. Optimizing the read signal can include maximizing an intensity of the read signal or converging on a target value. In some instances the track includes two parallel sub-tracks each encoding a different frequency, and in some of these embodiments optimizing the read signal includes minimizing a difference between intensities of sub-signals read from the sub-tracks.

DETAILED DESCRIPTION

Figure 1:
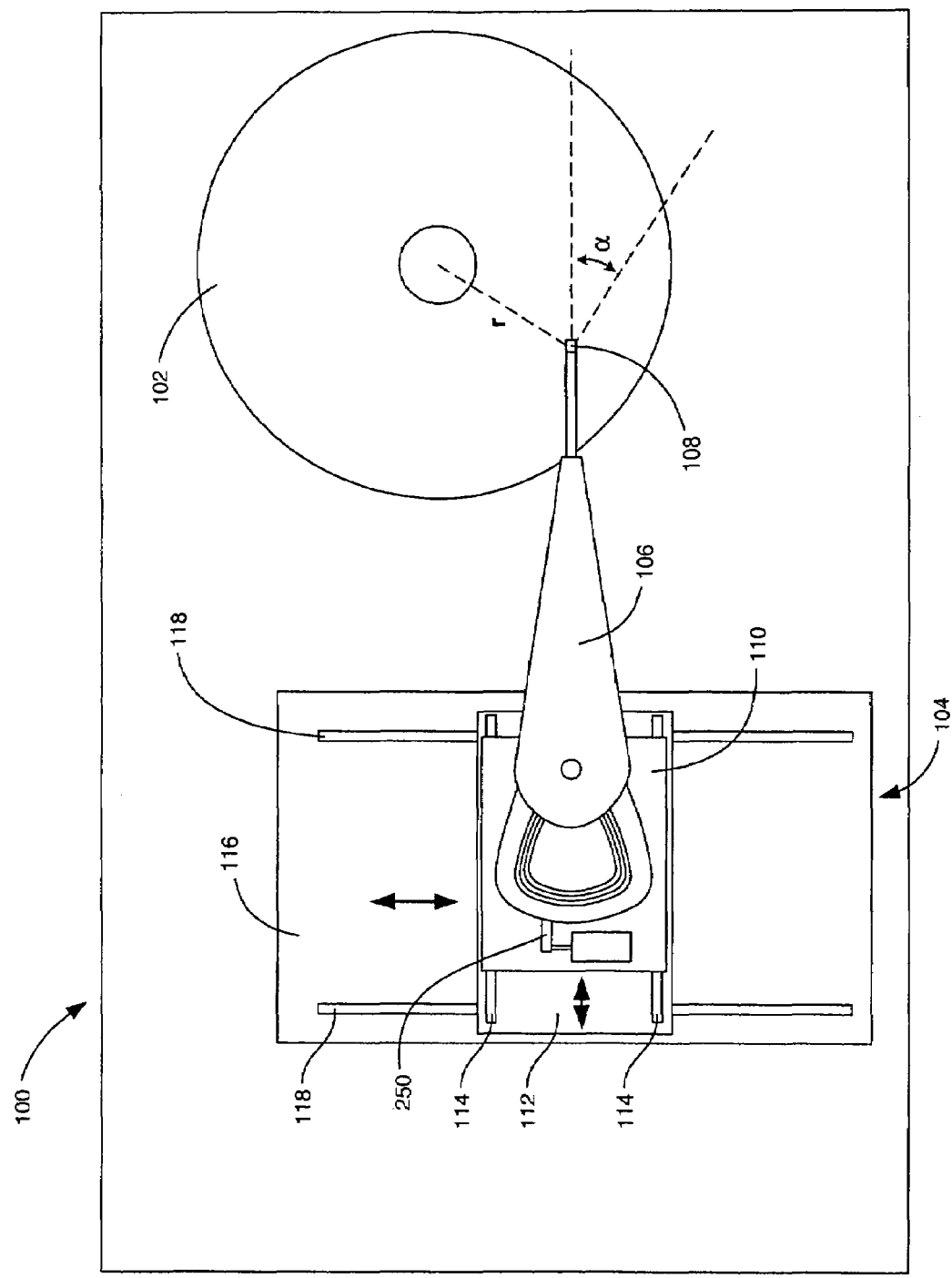
FIG. 1 shows a schematic illustration of an exemplary spin stand testing system according to an embodiment of the invention.

FIG. 1 is a schematic illustration of an exemplary spin stand testing system 100 according to an embodiment of the invention. The spin stand testing system 100 comprises a disk 102 and a positioning device 104. The disk 102 is representative of a magnetic recording disk that would be used in a disk drive and is configured to rotate around an axis at a variable rotation rate. The positioning device 104 secures a head stack assembly 106, including a head 108, and is configured to position the head 108 to a desired position over the disk 102. The positioning device 104 includes both apparatus for course adjustment and a head stack fixture including a fine positioner for use in a closed-loop servo system as described in more detail with respect to FIGS. 2–5.

As shown in FIG. 1, the exemplary positioning device 104 comprises an apparatus for course adjustment, which in this example includes two platforms on orthogonal rail systems. More specifically, the head stack assembly 106 is fixed to a base 110 on a first platform 112. The first platform 112 includes a set of rails 114 upon which the base 110 can move back and forth in a first direction relative to the first platform 112. A motor (not shown) is one example of a mechanism for driving the base 110 relative to the first platform 112. Similarly, the positioning device 104 also comprises a second platform 116 including a set of rails 118. In this embodiment the first platform 112 is configured to move upon the rails 118 relative to the second platform 116 in a second direction.

By moving the base 110 relative to the first platform 112, and by moving the first platform 112 relative to the second platform 116, the head 108 can be positioned at a desired disk radius, r, and skew angle, α (an angle formed between a longitudinal axis of the HSA 106 and a tangent to a radial line through the head 108). It will be appreciated, however, that neither the head stack fixtures or the spin stand testing systems disclosed herein are limited by the particular course positioning apparatus employed by the positioning device 104. The platform and rails system is described herein merely for illustrative purposes; other course positioning mechanisms can just as readily be employed.

Figure 2:
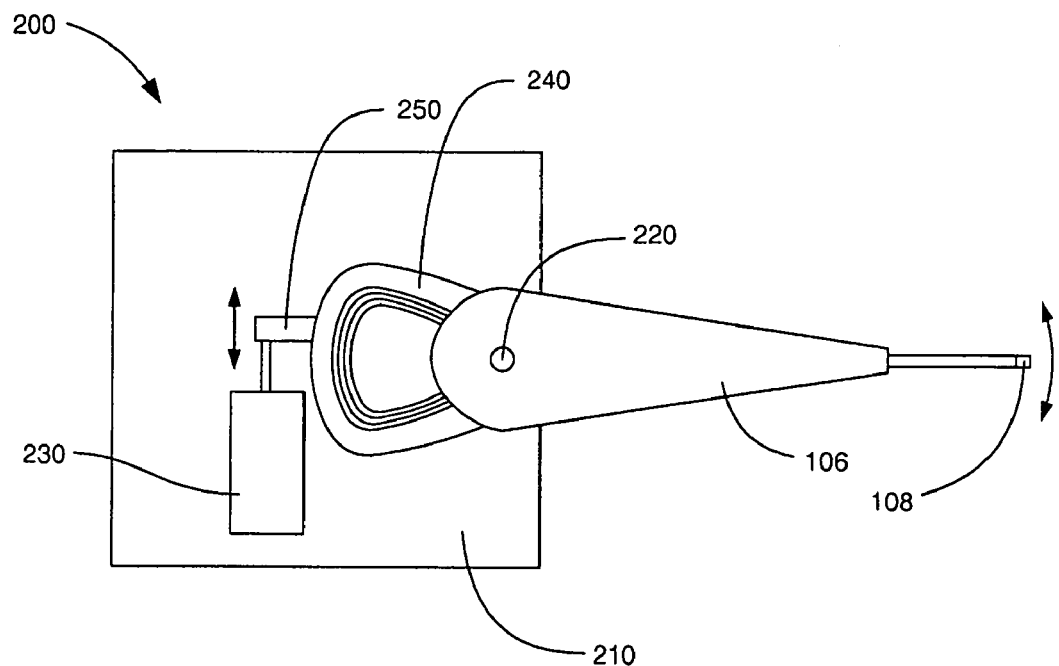
FIG. 2 shows a schematic illustration of a head stack fixture according to an embodiment of the invention.

FIG. 2 shows a schematic illustration of a head stack fixture 200 for securing a head stack assembly 106 during spin stand testing. As shown in FIG. 2, the head stack fixture 200 comprises a base 210, including an attachment mechanism 220, and a fine positioner 230. In general terms, the head stack fixture 200 can be a module for use with any course positioning mechanism of any spin stand testing system. In those embodiments in which the course positioning mechanism is the positioning device 104 (FIG. 1), the base 210 can be the platform 110 (FIG. 1).

The attachment mechanism 220 allows the head stack assembly 106 to be pivotably attached to the base 210, preferably in the same manner as if the head stack assembly 106 were installed in a disk drive. The fine positioner 230 is attached to the base 210 and engages the head stack assembly 106. When actuated, the fine positioner 230 is configured to pivot the head stack assembly 106 relative to the base 210. In some embodiments, as shown in FIG. 2, the head stack assembly 106 includes a voice coil 240 with a tang 250, and the fine positioner 230 engages the tang 250.

The fine positioner 230, in some embodiments, comprises a piezoelectric actuator that includes a piezoelectric material such as lead zirconium titanate (PZT). By applying a voltage across the piezoelectric material, the piezoelectric material can be made to controllably expand or contract, depending on the polarity of the applied voltage. It can be seen that as the fine positioner 230 activates laterally, the head stack assembly 106 pivots around the attachment mechanism 220 causing the head 108 to also move laterally.

Figure 3:
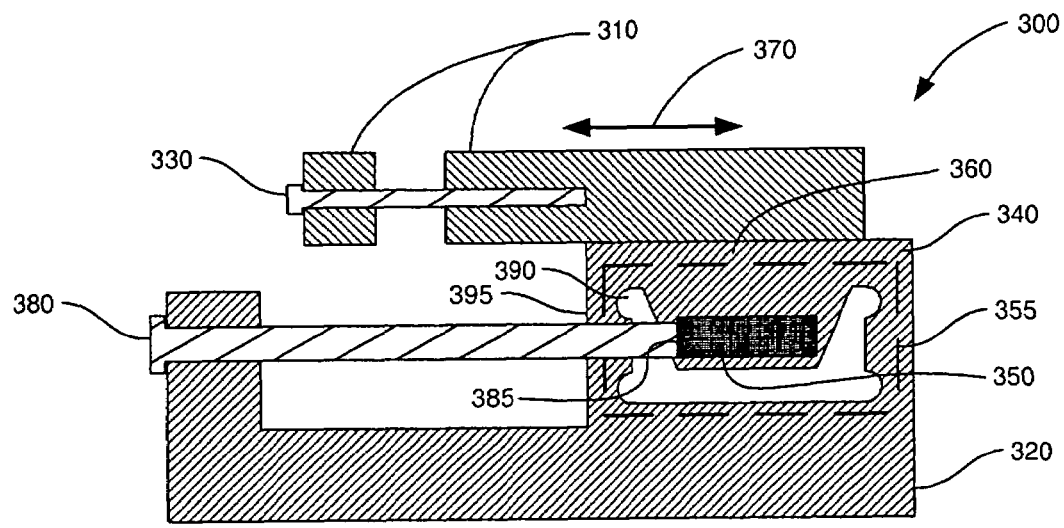
FIGS. 3 and 4 show, respectively, a cross-section and a top view of a fine positioner according to an embodiment of the invention.
Figure 4:
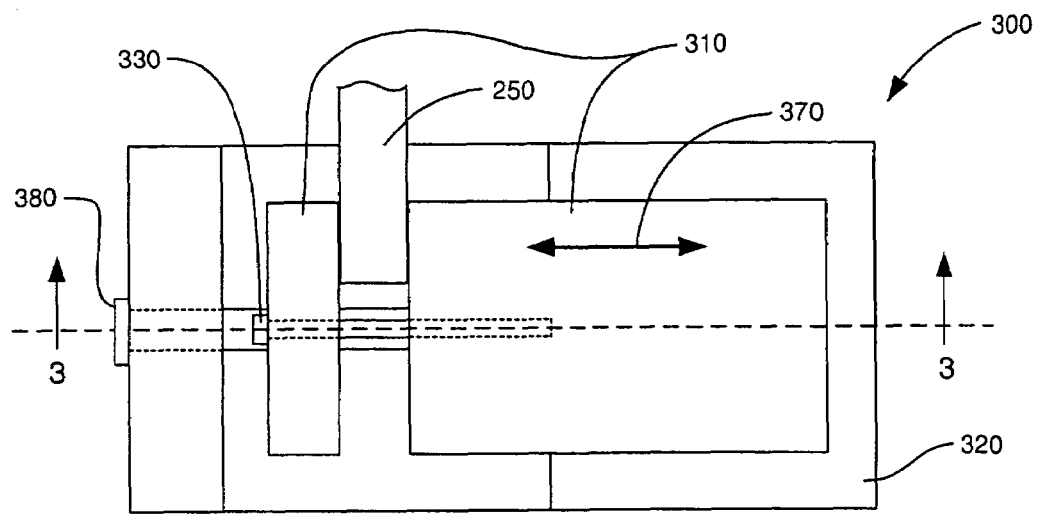

FIGS. 3 and 4 show, respectively, a cross-section and a top view of an exemplary fine positioner 300. Fine positioner 300 is an embodiment of the fine positioner 210 (FIG. 2). The cross-section of FIG. 3 is taken along the line 3—3 of FIG. 4. The fine positioner 300 includes a clamp 310 fixedly attached to a lower portion 320. The clamp 310 is configured to secure the tang 250, for example, by tightening a bolt or set screw 330.

The lower portion 320 includes an actuator housing 340 and a piezoelectric actuator 350. Although the actuator housing 340 and the clamp 310 are shown in FIG. 3 as separate components fixedly attached, in some embodiments these components are integrally formed. In the embodiment shown by FIG. 3, the actuator housing 340 is formed in the shape of a hollow parallelogram 355 including a top cross-member 360, and the piezoelectric actuator 350 is attached inside of the parallelogram 355 and to the top cross-member 360. It will be appreciated that other arrangements of the parallelogram 355 and piezoelectric actuator 350 are also possible; another possible arrangement is described further herein. The hollow parallelogram 355 is preferably open at both ends to allow the parallelogram 355 to deform, as described in more detail herein. It will be appreciated that although the shape of the actuator housing 340 is described herein as a parallelogram 355, the parallelogram 355 is preferably a rectangle as illustrated in FIG. 3.

The piezoelectric actuator 350 moves the clamp 310 in a lateral direction 370 in order to translate the tang 250 laterally so that the head stack assembly 106 pivots around the attachment mechanism 220, thus causing the head 108 to move laterally. The piezoelectric actuator 350 is able to move the clamp 310 laterally, in some embodiments, because it is configured to work against a fixed object such as a set screw 380 disposed through apertures in the actuator housing 340 in order to press against a first end 385 of the piezoelectric actuator 350. As noted above, a voltage applied to a piezoelectric material can make the piezoelectric material controllably expand or contract. Thus, application of a voltage to the piezoelectric actuator 350 can cause the piezoelectric actuator 350 to expand or contract in a lateral direction with respect to the first end 385. Since the first end 385 is constrained by the set screw 380, this expansion or contraction deforms the parallelogram 355 of the actuator housing 340 thereby moving the attached clamp 310.

The parallelogram 355 is able to more easily deform in response to the piezoelectric actuator 350, in some embodiments, because the parallelogram 355 includes notches 390 that reduce the thickness of the actuator housing 340 near the corners of the parallelogram 355, as shown in FIG. 3. Where the parallelogram 355 is thinned the parallelogram 355 flexes more easily. The remaining material of the parallelogram 355 at each notch 390 behaves as a spring that acts to restore the parallelogram 355 to its original shape when the force from the piezoelectric actuator is removed. As the notches 390 are made bigger and the remaining material is made thinner, the parallelogram 355 deforms more easily but the restorative force is reduced. Accordingly, these two considerations should be balanced for particular applications.

The set screw 380 is also able to apply a pre-load to the piezoelectric actuator 350. The pre-load is an external force applied to the piezoelectric actuator 350 to compress the piezoelectric actuator 350. To appreciate the benefit of the pre-load it is helpful to understand the behavior of piezoelectric materials in further detail. As is well known, not only will an applied voltage cause a dimensional change in a piezoelectric material, but causing a dimensional change by mechanically straining or compressing the piezoelectric material will produce a voltage across the piezoelectric material. This reciprocal relationship between dimensional change and voltage is commonly referred to as the piezoelectric effect.

The piezoelectric effect, however, is not symmetric with respect to compression and tension. That is, most piezoelectric materials can be made to expand much more than they can be made to contract. More particularly, each piezoelectric material has a linear response range in both compression and tension in which the relationship between applied voltage and dimensional change (or between dimensional change and induced voltage) is linear. Most piezoelectric materials exhibit a greater linear response range in tension than in compression.

It is desirable to be able to combine the linear ranges for tension and compression in order to obtain the greatest actuation range from the piezoelectric material of the piezoelectric actuator 350. In some embodiments this is achieved by applying either positive or negative voltages as needed to make use of both linear ranges. However, in other embodiments, the piezoelectric material of the piezoelectric actuator 350 is initially compressed by the pre-load. The pre-load compresses the piezoelectric material to near the end of the compressive linear range and causes a negative voltage to be induced across the piezoelectric material. Thereafter, the full linear range of actuation can be accessed with applied positive voltages rather than having to switch polarity between the tension linear response range and the compression linear response range.

It will be appreciated that the relationship of the piezoelectric actuator 350 to the actuator housing 340 in FIG. 3 and FIG. 4 is merely illustrative and other arrangements are also possible. Thus, in some embodiments the piezoelectric actuator 350 is located outside of the actuator housing 340. As an example, and with reference to FIG. 3, the piezoelectric actuator 350 can be placed to the left of the actuator housing 340 such that the piezoelectric actuator 350 is between the set screw 380 and the actuator housing 340 and abuts a sidewall 395 of the actuator housing 340 (which does not house the piezoelectric actuator 350 in this embodiment). In this embodiment, as above, the piezoelectric actuator 350 works against the set screw 380 to deform the parallelogram 355 of the actuator housing 340 to laterally translate the clamp 310.

Figure 5:
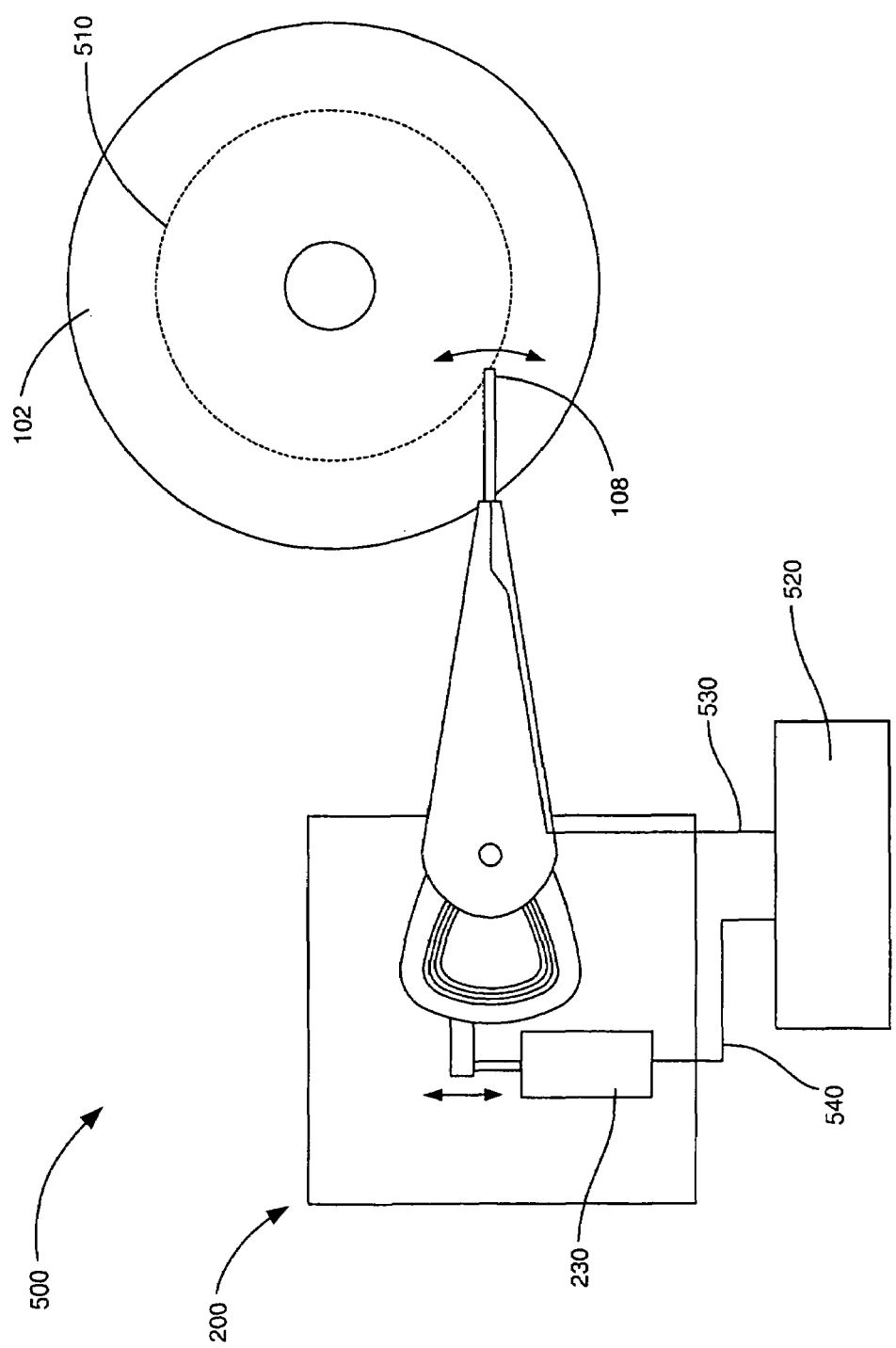
FIG. 5 shows exemplary components of a spin stand testing system according to an embodiment of the invention.

In addition to the head stack fixtures described above, spin stand testing systems comprising such head stack fixtures are also disclosed. FIG. 5 shows exemplary components of an embodiment of a spin stand testing system 500. As noted previously, since head stack fixtures of the invention can be employed with any course positioning apparatus, a course positioning apparatus has been omitted from spin stand testing system 500.

The spin stand testing system 500 includes a head stack fixture 200, a disk 102 having a track 510, and a controller 520. In operation, a positioning device (not shown) such as positioning device 104 (FIG. 1) is used to bring the head 108 to a desired location over track 510. As a read element (not shown) of the head 108 reads the track 510, a read signal is produced. The read signal is transmitted to the controller 520 along an electrical path 530 (common steps such as amplification and noise filtering are omitted here for simplicity). Although the controller 520 is shown in FIG. 5 as a discrete component, it will be understood that the controller 520 can also be integrated into the software or firmware of the spin stand testing system 500.

The controller 520 maintains a closed-loop servo feedback to lock the head 108 to the track 510 by optimizing the read signal through actuation of the fine positioner 230. To enable the closed-loop servo, the track 510 includes alignment information. The alignment information can be in the form of servo bursts at regularly spaced intervals around the track 510, as is commonly used on tracks in disk drives. Such servo bursts include information that, when read by the head 108, can be used to determine a misregistry of the head 108 relative to the track 510. The misregistry typically represents the displacement between a centerline of the track 510 and a center of a read element of the head 108. Alternately, because the track 510 is used for testing purposes and not particularly for data storage, the alignment information can be continuous along the length of the track 510 rather than in short servo bursts.

Accordingly, the controller 520 receives the read signal from a servo burst (or continuously, as the case may be) and seeks to reposition the head 108 to optimize the read signal. The head 108 is repositioned by adjusting an actuation signal applied to the fine positioner 230 by the controller 520 along an electrical path 540. The actuation signal is preferably a voltage to be applied to the piezoelectric actuator 350. Though typically the read signal is optimized by aligning the center of the read element to the centerline of the track 510, this is not always the case. For example, in some testing circumstances it is desirable to offset the head 108 from the track 510 by some finite amount.

Where the goal of optimization is to center the head 108 over the track 510, one alternative is to maximize an intensity of the read signal. In these instances, the controller 520 initially increases or decreases the voltage to the fine positioner 230 and based on the resulting change in the read signal intensity either continues to move the voltage in the same direction, or moves the voltage in the opposite direction, in order to find the position of the maximum read signal intensity. In some embodiments, however, a two-frequency servo burst (or continuous track) is employed. In these embodiments the alignment information is provided as two parallel sub-tracks divided by the centerline of the track 510, where each sub-track encodes a different frequency. Centering the head 108 over the track 510, in these embodiments, requires separating from the overall read signal the individual sub-signals from the two sub-tracks and minimizing a difference between the intensities of the two sub-signals.

Where the goal of optimization is to align the head 108 over the track 510 so that it is offset by a specific amount from the centerline, similar strategies can be employed. However, rather than simply maximizing a signal or minimizing a difference between sub-signals, in these embodiments the feedback loop converges on an intermediate target value. Accordingly, in some embodiments a calibration file of the radial position of the head 108 as a function of the read signal is first established. When a particular offset is desired when aligning the head 108, a target value for the read signal, or the difference between sub-signals, is determined from the calibration file. The calibration file can be established, for instance, by stepping the head 108 across the track 510 in known radial increments while measuring the read signal at each step.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A head stack fixture for securing a head stack assembly during spin stand testing, the head stack fixture comprising:
   a base including an attachment mechanism for pivotably attaching the head stack assembly; and
   a fine positioner, including a piezoelectric actuator, attached to the base and the head stack assembly and configured to pivot the head stack assembly relative to the base,
   wherein the fine positioner engages a tang of the head stack assembly.

2. A head stack fixture for securing a head stack assembly during spin stand testing, the head stack fixture comprising:
   a base including an attachment mechanism for pivotably attaching the head stack assembly; and
   a fine positioner, including a piezoelectric actuator, attached to the base and the head stack assembly and configured to pivot the head stack assembly relative to the base,
   wherein the fine positioner further includes an actuator housing having a shape of a parallelogram,
   wherein the piezoelectric actuator deforms the parallelogram in order to pivot the head stack assembly, and
   wherein the fine positioner further includes a set screw disposed against a first end of the piezoelectric actuator.

3. The head stack fixture of claim 2 wherein the set screw provides a pre-load to the piezoelectric actuator.

4. The head stack fixture of claim 2 wherein the piezoelectric actuator works against the set screw to deform the parallelogram.

5. A spin stand testing system comprising:
   a rotatable magnetic recording disk including a track;
   a head stack fixture for securing a head stack assembly during spin stand testing, the head stack fixture including
      a base having an attachment mechanism for pivotably attaching the head stack assembly; and
      a fine positioner, having a piezoelectric actuator, attached to the base and the head stack assembly and configured to pivot the head stack assembly relative to the base; and
   a controller configured to actuate the piezoelectric actuator to optimize a read signal from a head of the head stack assembly.

6. The spin stand testing system of claim 5 wherein the fine positioner engages a tang of the head stack assembly.

7. The spin stand testing system of claim 5 wherein the piezoelectric actuator includes lead zirconium titanate.

8. The head stack fixture of claim 5 wherein the fine positioner further includes an actuator housing having a shape of a parallelogram.

9. The head stack fixture of claim 8 wherein the piezoelectric actuator is disposed within the parallelogram.

10. The head stack fixture of claim 8 wherein the piezoelectric actuator deforms the parallelogram in order to pivot the head stack assembly.

11. The head stack fixture of claim 5 wherein the controller actuates the piezoelectric actuator by applying a voltage thereto.

12. The head stack fixture of claim 5 wherein the read signal is generated by reading alignment information on the track with the head.

13. The head stack fixture of claim 5 wherein optimizing the read signal includes using a closed-loop servo.

14. The head stack fixture of claim 5 wherein optimizing the read signal includes maximizing an intensity of the read signal.

15. The head stack fixture of claim 5 wherein the track includes two parallel sub-tracks.

16. The head stack fixture of claim 15 wherein optimizing the read signal includes minimizing a difference between intensities of sub-signals read from the sub-tracks.

17. The head stack fixture of claim 5 wherein optimizing the read signal includes converging on a target value.

* * * * *